United States Patent [19]

Sedam et al.

[11] E Patent Number: Re. 32,179

[45] Reissued Date of Patent: Jun. 10, 1986

[54] POST-MIX BEVERAGE DISPENSING SYSTEM SYRUP PACKAGE, VALVING SYSTEM, AND CARBONATOR THEREFOR

[75] Inventors: Jason K. Sedam, Dunwoody, Ga.; William R. Fuerst, Tucson, Ariz.

[73] Assignee: The Coca-Cola Company, Atlanta, Ga.

[21] Appl. No.: 671,973

[22] Filed: Nov. 16, 1984

Related U.S. Patent Documents

Reissue of:

[64] Patent No.: 4,359,432
Issued: Nov. 16, 1982
Appl. No.: 257,945
Filed: Apr. 27, 1981

U.S. Applications:

[62] Division of Ser. No. 84,434, Oct. 12, 1979, Pat. No. 4,306,667.

[51] Int. Cl.[4] ..... B01F 3/04

[52] U.S. Cl. ..... 261/26; 99/323.1; 137/389; 137/392; 261/121 R; 261/DIG. 7

[58] Field of Search ..... 261/70, 121 R, 26, DIG. 7; 99/323.1; 222/129.1, 146 C, 83.5, 481; 137/389, 392; 426/474, 477

[56] References Cited

U.S. PATENT DOCUMENTS

| | | | |
|---|---|---|---|
| 2,391,003 | 12/1945 | Bowman | 261/DIG. 7 |
| 2,588,677 | 3/1952 | Welty et al. | 261/DIG. 7 |
| 2,674,263 | 4/1954 | Rupp et al. | 222/129.1 X |
| 2,708,533 | 5/1955 | Nicholas | 222/146 C |
| 2,750,076 | 6/1956 | Welty et al. | 222/129.1 |
| 3,199,738 | 8/1965 | Cary | 222/129.1 X |
| 3,382,897 | 5/1968 | Skiera et al. | 222/129.1 X |
| 3,618,905 | 11/1971 | Primus | 261/DIG. 7 |
| 3,809,292 | 5/1974 | Booth et al. | 261/DIG. 7 |
| 3,926,342 | 12/1975 | Selvia et al. | 261/DIG. 7 |
| 4,093,681 | 6/1978 | Castillo et al. | 261/DIG. 7 |
| 4,148,334 | 4/1979 | Richards | 261/DIG. 7 |
| 4,216,885 | 8/1980 | Sedam | 222/481 |

*Primary Examiner*—Richard L. Chiesa
*Attorney, Agent, or Firm*—Birch, Stewart, Kolasch & Birch

[57] ABSTRACT

A post-mix carbonated beverage dispensing system for use in refrigerated cabinets includes a carbonator having a refillable water reservoir, a $CO_2$ system coupled to said carbonator, a valving system, and a disposable package for containing and dispensing the syrup of the post-mix beverage at a controlled rate of flow. The water reservoir may be manually refilled from a water pitcher. The $CO_2$ system includes a cylinder which is also disposed within the refrigerator cabinet and is coupled to the carbonator. The valving system may include a plurality of dispensing valves and mixing nozzles for dispensing different selected beverages depending upon which of the valves is actuated. In addition, carbonated water alone may be dispensed. The disposable syrup package includes a plastic container having a flow rate control tube therein and means in said flow rate control for precluding spillage of syrup when the package temperature becomes elevated from opening and closing the refrigerator door. The disposable syrup packages are adapted for quick insertion into the top of the valving system by inverting the syrup packages and plugging them into a socket in the dispensing valve mechanism.

2 Claims, 17 Drawing Figures

POST-MIX BEVERAGE DISPENSING SYSTEM SYRUP PACKAGE, VALVING SYSTEM, AND CARBONATOR THEREFOR

Matter enclosed in heavy brackets [ ] appears in the original patent but forms no part of this reissue specification; matter printed in italics indicates the additions made by reissue.

This application is a divisional, of copending application Ser. No. 084,434, filed on Oct. 12, 1979 which is now U.S. Pat. No. 4,306,667.

BACKGROUND OF THE INVENTION

1. Field of the Invention

The present invention relates to a post-mix soft drink dispenser system suitable for use in a refrigerator.

2. Description of the Prior Art

Heretofore, attempts have been made to provide post-mix dispenser systems for use in refrigerators which are compact and easily incorporated into existing refrigerators and which are capable of dispensing post-mix soft drink beverages of suitable quality. However, due to various design features of these prior art systems the above objectives have never been satisfactorily achieved. Examples of such systems can be found in the following U.S. Pat. Nos. 2,785,546 to Bauerlein, issued Mar. 19, 1957; 2,894,377 to Shikles, Jr. et al, issued July 14, 1959; 2,823,833 to Bauerlein, issued Feb. 18, 1958; 3,292,822 to Crowder et al, issued Dec. 20, 1966; 3,756,473 to Donahue, issued Sept. 4, 1973; and 3,942,685 to Lidner, issued Mar. 9, 1976.

U.S. Pat. Nos. 2,785,546, and 2,823,833 to Bauerlein, 3,756,473 to Donahue, and 3,942,685 to Lidner disclose post-mix beverage dispenser units designed for use in refrigerators. These dispenser systems will selectively dispense either ice water, or a mixture of syrup concentrate and water. There are no provisions in the systems of Bauerlein for dispensing carbonated water or carbonated beverages. In addition, the water for the systems of Bauerlein is provided through a pipe which must pass through the wall of the refrigerator making retro-fitting of the Bauerlein system somewhat complex. One glaring disadvantage of the Bauerlein systems is that the syrup concentrate is contained in a refillable container rather than in a disposable syrup package, which creates cleaning problems and unsanitary conditions.

The dispenser system described in U.S. Pat. No. 2,894,377 to Shikles, Jr. et al has more versatile dispensing capabilities than the dispenser systems of Bauerlein, Donahue and Lidner described above, since it can dispense carbonated water and carbonated post-mix beverages in addition to tap water and post-mix combinations of tap water and syrup. However, the Shikles, Jr. et al system still suffers from certain disadvantages. For example, the Shikles, Jr. et al system requires an external water supply which must be piped in through the walls of a refrigerator making retro-fitting of the system more complicated than desirable. In addition, although the syrup packages of Shikles, Jr. et al are removeable, they are not as easily inserted into the system as desirable, since several connections are necessary between the syrup package of Shikles, Jr. et al and other components of the system. Furthermore, the syrup package of Shikles, Jr. et al will not provide the necessary controlled rate of flow needed to obtain a high quality of beverage with the same proportions of carbonated water and syrup for every beverage dispensed.

U.S. Pat. No. 3,292,822 to Crowder et al disclosed in FIGS. 17 and 18 a post-mix carbonated beverage dispenser system contained within the door of a refrigerator including a manually refillable water reservoir for the carbonator and disposable syrup packages. However, the method of inserting the syrup packages into the system is somewhat cumbersome, the valving system has limited capabilities, and the syrup is not dispensed at a satisfactorily controllable rate of flow.

Prior to the present invention the use of a flow rate control tube in the syrup container of a post-mix dispenser for providing an even rate of flow of syrup from the container into a receptacle was generally known. An example of a system of this type is disclosed in U.S. Pat. No. 2,708,533 to Nicholas. Nicholas discloses the broad concept of providing a flow control tube 76 in the syrup tank of a post-mix beverage system having its open or bottom end precisely positioned-at a predetermined level above the discharge opening of the tank in order to provide a substantially constant rate of flow of the syrup being dispensed from the tank. The Nicholas patent also discloses in FIG. 2 that the syrup tank of his invention may be a disposable tin can that is filled at a central distributing plant and delivered in a completely sealed condition to the location of the dispensing system. As illustrated in FIG. 2 of Nicholas, the bottom of the tin can is rupturable by puncturing elements associated with the dispenser valve and the top of the can is provided with a knockout 118 into which stopper 74 and flow control tube 76 is inserted just prior to the dispensing operation. The flow control tube 76 is positioned within the container at a predetermined position determined by graduations 124 on the flow control tube which instructs an operator as to the proper position of the tube for preselected different flow rates for syrups of different Brix values.

Although, once the system of Nicholas is assembled, it operates in a very satisfactory manner for controlling flow rate, it does suffer from certain disadvantages. For example, in the Nicholas patent the flow control tube is a completely separate item from the syrup package which is shipped from the distributing plant to the point of use. Thus, the flow control tube 76 in Nicholas system requires special assembly at the point of use and skilled adjustment of its position within the syrup container. While it might be possible for an operator in a commercial establishment to learn how to properly insert the flow control tube, the occasional user of the system would have difficulty inserting the flow control tube in the correct position for the different Brix values of syrups to be dispensed. In addition, the syrup container of Nicholas could be refilled through the knockout portion 118 which would lead to problems of improper or inadequate sanitation. Still further, if the temperature of the syrup container of Nicholas is elevated, syrup will rise up tube 76 and spill over through the top thereof.

Other examples of the use of flow control or vent tubes in syrup packages can be found in U.S. Pat. No. 3,258,166 to Kuckens, issued June 28, 1966 and U.S. Pat. No. 3,991,219 to Kuckens, issued Nov. 19, 1976. Each of these patents disclose inverted containers having flow control vent tubes formed therein. However, the vent tubes in each of these patents are completely open to the atmosphere. That is, no means are provided for precluding the flow of liquid up the vent tubes. Thus, at elevated temperatures the head-space of gas above the liquid in the containers will create a back-pressure forcing the liquid up the vent tubes causing spillage.

An additional U.S. Pat. No. 3,807,607 to Kuckens issued Apr. 30, 1974 discloses a syrup container 1 having a vent tube 11 therein and a gas responsive check valve 12 in the top of vent tube 11. The check valve 12 of Kuckens is provided to inhibit flow of syrup up tube 11 when container 1 is being refilled in contrast to precluding flow up the tube in response to container 1 being heated to an elevated temperature. Applicant has discovered that the location of valve 12 of Kuckens at the top of tube 11 is unsatisfactory, if fluid flow up the tube 11 were to be caused by an elevated container temperature. In such as case fluid might flow substantially all of the way to valve 12 at the top of vent tube 11 before valve 12 closed. This would result in the accumulation of syrup on the inner walls of tube 11 causing clogging and/or contamination. Moreover, as stated hereinbefore, the Kuckens valve 12 is not disclosed as being provided to preclude flow up tube 11 in response to an elevated container temperature. In short, the Kuckens syrup dispensing apparatus is not designed for use in a refrigerator where the opening and closing of the refrigerator door may cause elevated syrup package temperatures resulting in the tendency of syrup to flow up the vent tube in response to those elevated temperatures.

Check valves have also been used heretofore in vent tubes of containers for dispensing products other than syrup. However, these check valves were utilized to preclude spilling of liquid when the container is inverted to an upright non-dispensing position. The designers of these prior art devices were not concerned nor cognizant of the problem of fluid spillage of liquid due to an elevated container temperature and a resulting flow of liquid up the vent tube. Examples of such prior art containers can be found in U.S. Pat. Nos. 600,327 to Winters, issued Mar. 8, 1898; 2,283,652 to Schwarzkopf issued May 19, 1942; 2,336,313 to Swann issued Dec. 7, 1943; and 2,822,962 to Poitras issued Feb. 11, 1958.

SUMMARY OF THE INVENTION

Accordingly, it is a primary object of the present invention to provide a post-mix beverage dispenser system which operates satisfactorily when contained in a refrigerator.

It is a further object of the present invention to provide a post-mix beverage dispenser system which can be easily retrofitted into an existing refrigerator.

It is another object of the present invention to provide a post-mix beverage dispensing system for use in home refrigerators with no need for water pipes passing through the refrigerator.

It is still another object of the present invention to provide a compact dispenser valving system equipped with a multiplicity of beverage dispensing options.

It is a further object of the present invention to provide a disposable package for dispensing post-mix syrup with a controlled rate of flow, which is completely assembled at the time of shipping and requires no adjustment on the part of the user at the point of use.

It is a further object of the present invention to provide a disposable package for dispensing liquids with a controlled rate of flow which cannot readily be filled for reuse.

It is still a further object of the present invention to provide a syrup dispensing package including means to preclude overflow or spillage in response to increases in the package temperature above predetermined levels caused by opening and closing the door of the refrigerator containing the package.

It is another object of the present invention to provide a lightweight disposable package for dispensing liquids including means for preventing damage to the package during shipping.

It is still another object of the present invention to provide a disposable package for dispensing liquids with a controlled rate of flow which is lightweight and inexpensive to manufacture.

The objects of the present invention are fulfilled by providing a post-mix carbonated beverage dispensing system including a carbonator having a refillable water reservoir, a $CO_2$ supply system coupled with said carbonator, a valving system which facilitates the selection of a multiplicity of beverages or a combination thereof, and a disposable package for containing and dispensing the syrup of the post-mix beverage at a controlled rate of flow. The system is designed so that each of the component parts which make up the system can be contained entirely within a refrigerator.

The carbonating system includes a stainless steel carbonating tank and a reservoir tank for storing a supply of water to be carbonated. Water from the reservoir tank is fed through a tube or conduit by a small motor and pump from the reservoir tank to the carbonating tank. The carbonator tank in a preferred embodiment has sufficient capacity to store enough carbonate water for two six-ounce drinks ready to dispense on demand. Replacement of the carbonated water supply in the carbonator tank begins immediately as a drink is drawn from the dispensing valves via the pump and conduit connecting the reservoir tank to the carbonator tank. Since the replacement of carbonated water begins immediately, eighteen ounces of product can be continuously drawn from a dispensing valve before the carbonated water supply is exhausted. A like quantity can be again drawn from the dispensing valve after waiting one minute for replenishment of the carbonated water supply. The carbonating system further includes water level controls in the carbonating tank which cycles the motor and pump on and off, as water is withdrawn from the dispensing valves. An additional safety feature of the carbonating system is that the pump becomes inoperative in the event that the water supply in the reservoir is too low. This is because the pump is not self-priming when pressure is in the tank. On start up, the carbonator must pump water into the tank before $CO_2$ is introduced which is desireable in order to purge the carbonator tank of air.

Another significant feature of the carbonating system of the present invention is that the carbonating tank is mounted so that it is immersed in the water of the reservoir tank. The carbonating tank and it's contents are therefore chilled to provide the coldest beverage possible. Water replenishment in the reservoir tank is accomplished manually by filling a water pitcher from a spigot, removing a lid from the top of a reservoir tank, and manually refilling the reservoir tank. This is a particularly significant feature of the present invention in that no water pipes passing through the walls of the refrigerator are required making retro-fitting of the dispenser system of the present invention relatively simple. However, if desired the water supply to the reservoir tank can be piped in through the walls of the refrigerator and a suitable control valve.

Carbon dioxide is delivered to the carbonator tank of the present invention from a conventional $CO_2$ cylinder through a pressure regulator and a duck-bill check valve to a fitting in the top cover of a carbonator tank. It then passes through a tube to the bottom of the tank where it is dispersed into the water by a diffusion device of a type well known in the art.

The valving system of the present invention in a preferred embodiment includes at least three dispenser nozzles and three associated sockets on the top of the valving system with a membrane piercing device in each socket which will accept the neck of the disposable syrup container in a simple one-step plug-in operation. The valving system for each syrup container includes a pair of valves of elastomeric sealing members in fluid communication with the disposable syrup packages and carbonated water supplies, respectively, and, a mixing chamber including a diffusing plate to spread carbonated water over the interior of a removeable dispensing nozzle. The syrup from the disposable packages is fed through a tube which projects through a hole in the diffusion plate to the region below said plate within the nozzle. The syrup tube in the valving system has a replaceable restriction button at its lower end which, together with the controlled hydraulic head in the syrup package above provided by the flow rate control tube, controls the rate of flow of the syrup. The replaceable restriction button is sized to provide a constant flow of syrup. For example, one of three buttons each with a specific orifice may be provided to control the flow of high brix syrups, low brix syrups, or diet syrups. The valving system may be actuated to obtain carbonated water only or a selected flavor of post-mix carbonated beverage. An additional dispensing valve may be provided for dispensing uncarbonated ice water.

The disposable syrup package comprises a disposable plastic bottle having relatively thin sidewalls, which incorporated, as a substantially integral part thereof, a tube through one end of the container precisely positioned within the container to establish a controlled rate of flow of the syrup during dispensing. The tube initially has one end extending through the bottom or closed end of the plastic bottle and an opposite end which is open and positioned at a predetermined distance from the discharge end of the bottle, in order to develop an effective hydrostatic pressure head at the point of said predetermined distance. The closed end of the tube is recessed into the end of the bottle through which it extends in order to protect the same from rupture during shipping.

In operation with a conventional post-mix syrup dispenser, the plastic bottle or package of the present invention is inverted and inserted into the sockets of the valving system against a sharp piercing device. The piercing device ruptures a membrane extending across the open end of the bottle to form a dispensing outlet. The closed end of the flow control tubes is then ruptured or opened to permit the flow of air into the tube. A pressure balance is then created within the bottle as the liquid is withdrawn and replaced by air, and from this point on, the tube in the bottle functions to control the rate of flow of syrup at a substantially constant rate as the contents of the bottle are dispensed.

In a preferred embodiment the flow control tube is provided with a check valve adjacent the open end thereof to preclude syrup from rising up the tube when a predetermined temperature level of the package is exceeded caused by opening and closing the refrigerator door. For temperature below this level the check valve does not impede the flow of air down the tube.

BRIEF DESCRIPTION OF THE DRAWINGS

The objects of the present invention and the attendant advantages thereof will become more readily apparent by reference to the accompanying drawings wherein.

DETAILED DESCRIPTION OF THE PREFERRED EMBODIMENTS

Figure 14:
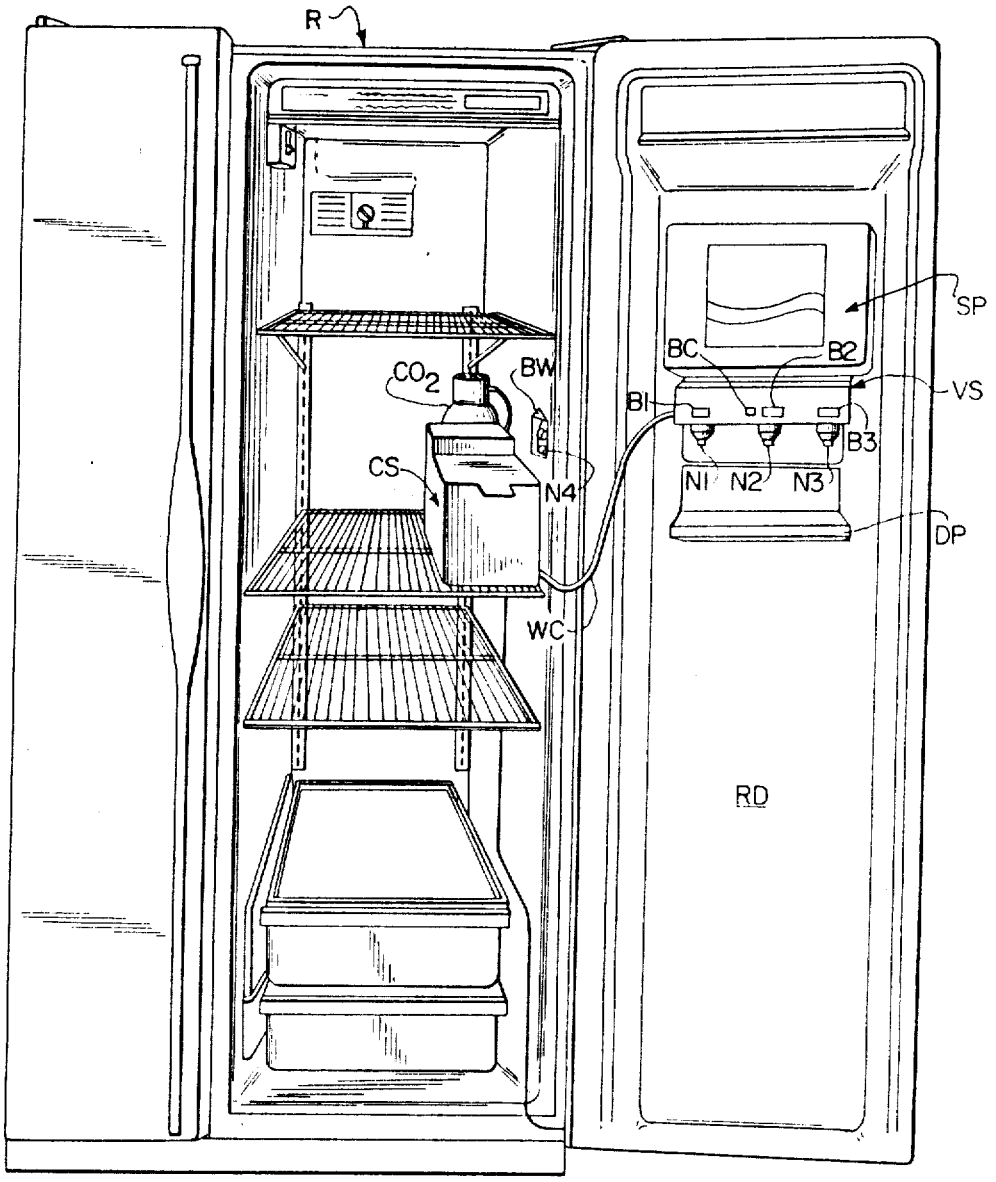
FIG. 14 is a perspective view of the post-mix dispenser system of the present invention mounted within a refrigerator such as is commonplace in commercial food service establishments in many foreign countries; and, FIG. 15 is a side elevational view of a flow restriction button for use in the valve unit of FIG. 12.

Referring briefly to FIG. 14 there is illustrated the post-mix dispenser system of the present invention mounted within a commercial type refrigerator R. A carbonating system CS and $CO_2$ tank rest on any one of the refrigerator shelves. The valving system VS, syrup packages SP, and drip pan DP are mounted on the inside of the door RD. If desired, the valving system could be accessible from the outside of door RD, if built into the refrigerator at the factory.

The valving system VS has a plurality of nozzles N1, N2, N3 which dispense selected soft drinks in response to the actuation of buttons B1, B2 and B3, respectively. A button BC is also provided and upon actuation thereof carbonated water alone may be dispensed through nozzle N2. A separate nozzle N4 and button BW are provided for dispensing uncarbonated ice water.

SYRUP PACKAGE

The syrup package SP of FIG. 14 contains three disposable packages of the type illustrated in FIGS. 1 to 7.

Figure 1:
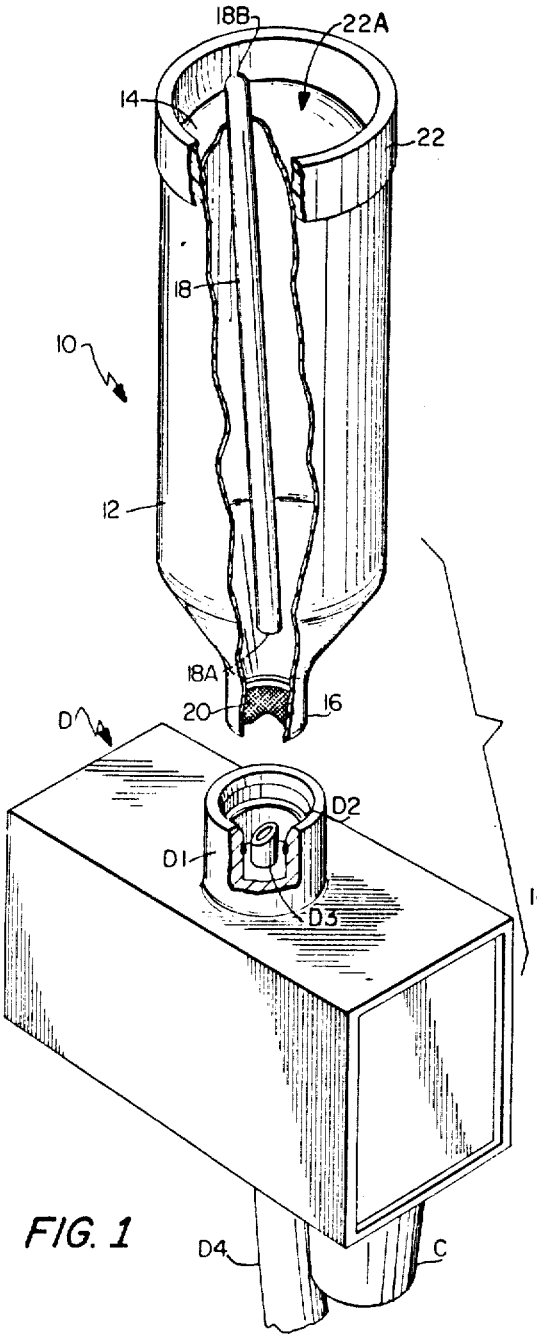
FIG. 1 is a perspective view partially in section illustrating the disposable package of the present invention just prior to insertion into the valve seat of a beverage dispenser system.

Referring in detail to FIG. 1, there is illustrated a disposable package of the present invention generally indicated 10 depicted in a position just prior to its insertion into a dispensing means generally indicated D, such as a conventional post-mix dispenser.

Figure 2:
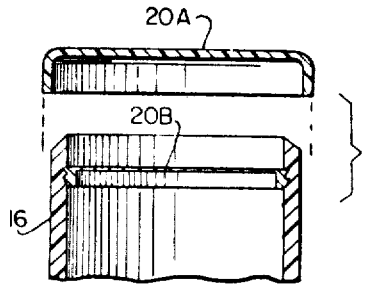
FIG. 2 is an enlarged view in cross section illustrating the details of the closure member for the open end of the disposable package of the present invention.

The disposable package 10 of the present invention includes a plastic bottle or container 12 having thin sidewalls, a closed end 14 and an open end 16 defining a discharge opening of the disposable package. The open end 16 is provided with a closure member 20 including, as illustrated in FIG. 2, an outer closure member 20A which snaps over the end 16 of container 12 and a rupturable membrane such as a metal foil which is secured across the inside or the end of the discharge opening defined by container end 16. A flow control tube 18 is permanently secured at a predetermined position within container 12 and has an open end 18A positioned at a predetermined distance above the discharge opening defined by open end 16 of the container, and a closed but sealed or frangible end 18B which extends through the end portion 14 of the container 12. The closed end portion 18B of tube 18 is disposed within the confines or recess 22A defined by annular skirt member 22 of plastic or other suitable material which is secured to the end of container 12, the recess may be formed as part of the container 12.

The entire package generally indicated 10 in FIG. 1 is manufactured as a substantially integral unit and is shipped as said unit to a point of use as will be described more fully hereinafter. The tube 18 is permanently secured in a fixed position in end wall 14 by a suitable adhesive, sealant or other bonding means. In the alternative, tube 18 could be integrally molded or formed with the end wall 14. A still further alternative is to form the container 12 of material which shrinks after molding, form a hole in the bottom, insert tube 18 to a desired position, and allow the container 12 to shrink around tube 18 to secure it in place.

The dispenser mechanism suitable for use in the present invention is generally indicated D in FIG. 1 and is of the type generally used for dispensing post-mix soft drink beverages. This dispenser for example, may comprise a socket on the upper surface thereof including an upstanding annular sidewall D1 and an O-ring seal D2. Extending upwardly in the socket and located substantially centrally thereof is a piercing device D3. The piercing device D3 is designed to puncture the rupturable membrand 20B sealed across the open end of container 12, as container 12 is lowered or inserted into the socket of the dispenser D. A dispenser lever D4 or other valve-actuating means is provided as is well known for cooperation with a cup into which the post-mix beverage is to be dispensed. A mixing nozzle C is provided should the liquid in the package be mixed with another liquid such as carbonated water.

A preferred embodiment of a dispenser and valving system will be described hereinafter with respect to FIGS. 12 and 13 the illustration in FIG. 1 being only an example.

Figure 3:
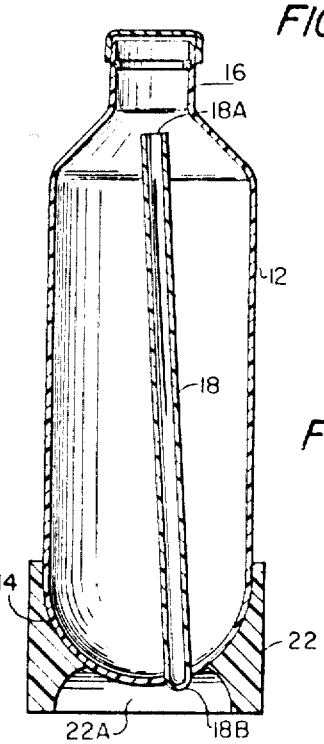
FIG. 3 is a cross-sectional view of the disposable package of the present invention illustrating a first embodiment of a means for preventing damage to the end of the flow control tube of the present invention during shipping of the package.

Referring in detail to FIG. 3, there is illustrated in cross section the annular skirt 22 of the package of FIG. 1 which is suitably secured to closed end 14 of container 12 or is formed as part of the container. The annular skirt 22 defines a recess 22A into which closed end 18B of tube 18 is contained. Since end 18B of tube 18 is frangible or sealed, it is necessary to provide skirt 22, in order to prevent rupturing or damage to end 18B or other seal during shipping and storage of the disposable package 10. The recess is also necessary so that the containers stand upright during shipment, storage or display.

Figure 4:
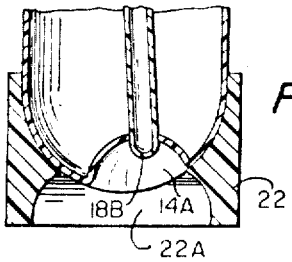
FIG. 4 is a partial cross-sectional view of the disposable package of the present invention illustrating an alternate end configuration of the package for preventing damage to the flow control tube end.

An alternate configuration for the tube end protection means of FIG. 3 is illustrated in FIG. 4 and includes, in addition to the annular skirt 22, a recessed portion 14A in the closed end 14 of container 12 in which the tube end 18B is recessed. It can be seen in both the embodiments of FIG. 3 and FIG. 4, that if the disposable package 10 of the present invention is dropped during shipping, it will most likely land on annular skirt 22 and the rupturing of tube end 18B will be prevented.

Applicant has found that the opened container 12, after stabilizing at a refrigerated temperature and when subsequently warmed, by opening and closing of the refrigerator door develops increased pressure in the trapped head-space due to the expansion of the head-space air. The increased head-space pressure will drive syrup back up the tube 18 resulting in spillage through the open end 18B at the top of the tube.

Figure 5:
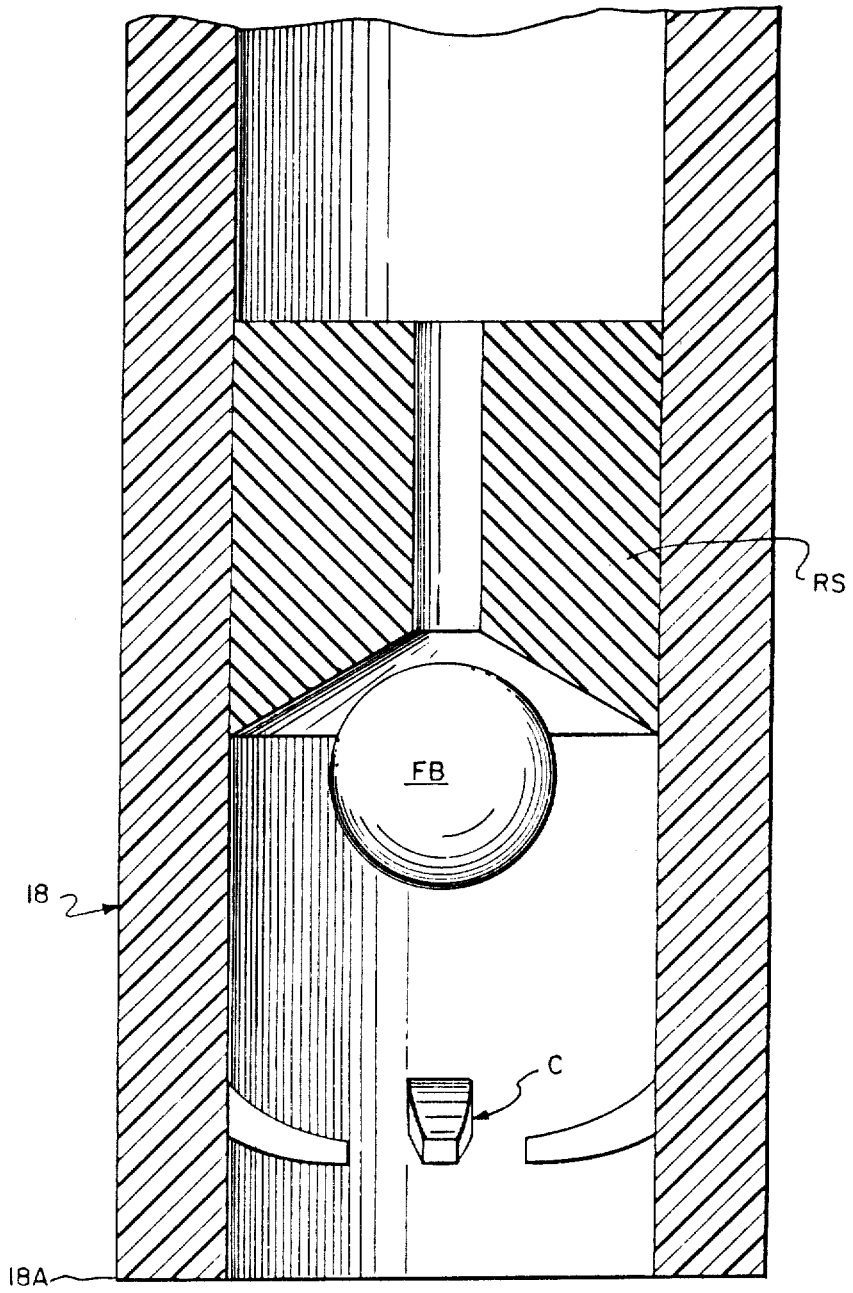
FIG. 5 is a partial section of the flow control tube of the present invention illustrating an additional preferred embodiment thereof.

To counteract this effect, a suitable check valve is provided within the container, preferably at the end of or within the flow rate control tube 18, as illustrated in FIG. 5. One such check valve may consist of a resilient seat RS against which acts as a ball FB, suitably caged at C to prevent loss, which floats in the syrup contained in the tube 18. The flotation provides the biasing pressure to effect initial seating of the ball FB on the resilient seat PS when the syrup is being driven up the tube by the increased head-space pressure resulting from warming of the container and its contents by opening and closing the refrigerator door. The biasing pressure increases to effect a syrup-tight seal against seat RS as head-space pressure becomes greater due to further warming, thereby stopping the rise of syrup in the tube 18 and resultant spillage.

Figure 6:
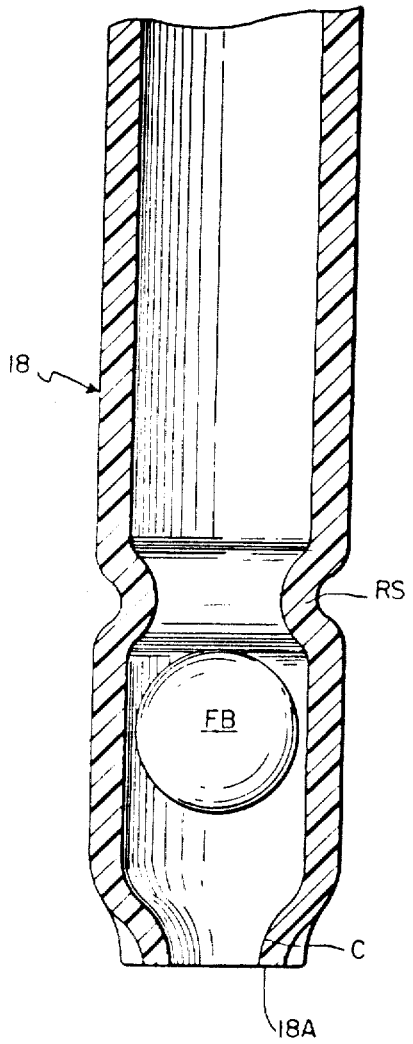
FIG. 6 is a partial sectional view of still another embodiment of the flow control tube of the present invention.
Figure 7:
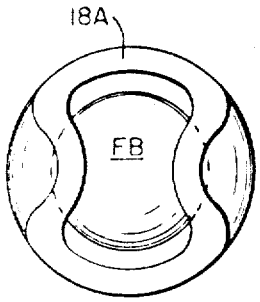
FIG. 7 is a bottom end view of the flow control tube of FIG. 6.

If desired the cage C and valve seat RS can be integrally formed with tube 18. For example, seat RS and cage C may each comprise convex proturbences on the inside walls of tube 18 formed by corrugations in the tube wall as shown in FIGS. 6 and 7. This greatly simplifies the fabrication of the check valve.

Prior art systems mentioned hereinbefore have no provision to prevent spillage due to the expansion of the head-space air.

Although the check valve described in one type suitable for the purpose, other means will be obvious to those skilled in the art, such as reed or duck-bill types. The check valve must in no case substantially impede the downward flow of the air through tube 18 which produces a balanced hydrostatic pressure at the desired location within the container. Therefore, other check valves which depend on mechanical means for bias in the closing direction must be made in such fashion that the biasing force is very low.

Since the check valve is used only during the life of the disposable container and is discarded along with the container there is no need for sanitizing the check valve between periods of use or between container changes. Judicious selection of materials and of the dimensional relationship between the ball and the resilient seat assures that the ball is covered with syrup when it moves to the closed position urged by the syrup, thus avoiding sticking of the valve while in use due to the drying of the syrup.

In operation, the disposable package 10 as illustrated in FIG. 1 is inverted into the position shown with open end 16 pointing downwardly and is inserted into the socket in the dispenser D or the valving system VS of FIGS. 12 and 13 to be described hereinafter, whereby membrane 20B is punctured by piercing device D3. Once in this position, frangible or sealed end portion 18B of tube 18 is broken or opened to permit the entry of air therethrough into container 12. As air flows through tube 18 into container 12 as the liquid is withdrawn, a pressure balance is created within the container and from this point on functions to control the flow of the syrup or other liquid at a constant rate from the container through the dispenser mechanism D of FIG. 1 or valving system VS of FIGS. 12 and 13 and into receptacle or cup C. A constant rate of flow is achieved because tube 18 with air contained therein establishes an effective hydrostatic pressure head at point 18A in container 12 and thus, the flow rate of syrup from the container is substantially constant.

The disposable syrup package of the present invention may be manufactured with the tube 18 at different respective positions depending on the Brix valve of the syrup to be contained therein.

In other words, if a predetermined constant flow rate is desired, it is necessary in determining the proper positioning of the open end 18A of tube 18 to take into consideration the Brix value of the syrup to be dispensed. However, the present invention offers the advantage that the positioning of tube 18 is done only by skilled and trained personnel in the manufacturing plant and not by an unskilled operator in the field at the point of use.

The disposable package 10 may be manufactured of any suitable materials. For example, the bottle 10 may be manufactured of thin plastic or glass, although plastic is preferred. The flow rate control tube 18 may also be manufactured of plastic or glass. The annular skirt portion 22 may be fabricated from the heavy duty high impact resistant plastic or rubber or formed as part of the container itself. The rupturable membrane 20B provided in the open end 16 of container 12 may be metal foil, plastic, or anay other suitable material which will seal the end of the container without contaminating its contents. If the membrane is plastic, it may be heat sealed to the end of the container 12.

In the preferred embodiments of the present invention the closed end 14 of the container is integral with the remaining portions and the closed end of the tube 18B is frangible. However, other modifications can be made within the spirit and scope of the present invention. For example, the entire end wall 14 may comprise a removable cap which is separable from the container.

CARBONATOR SYSTEM

Figure 8:
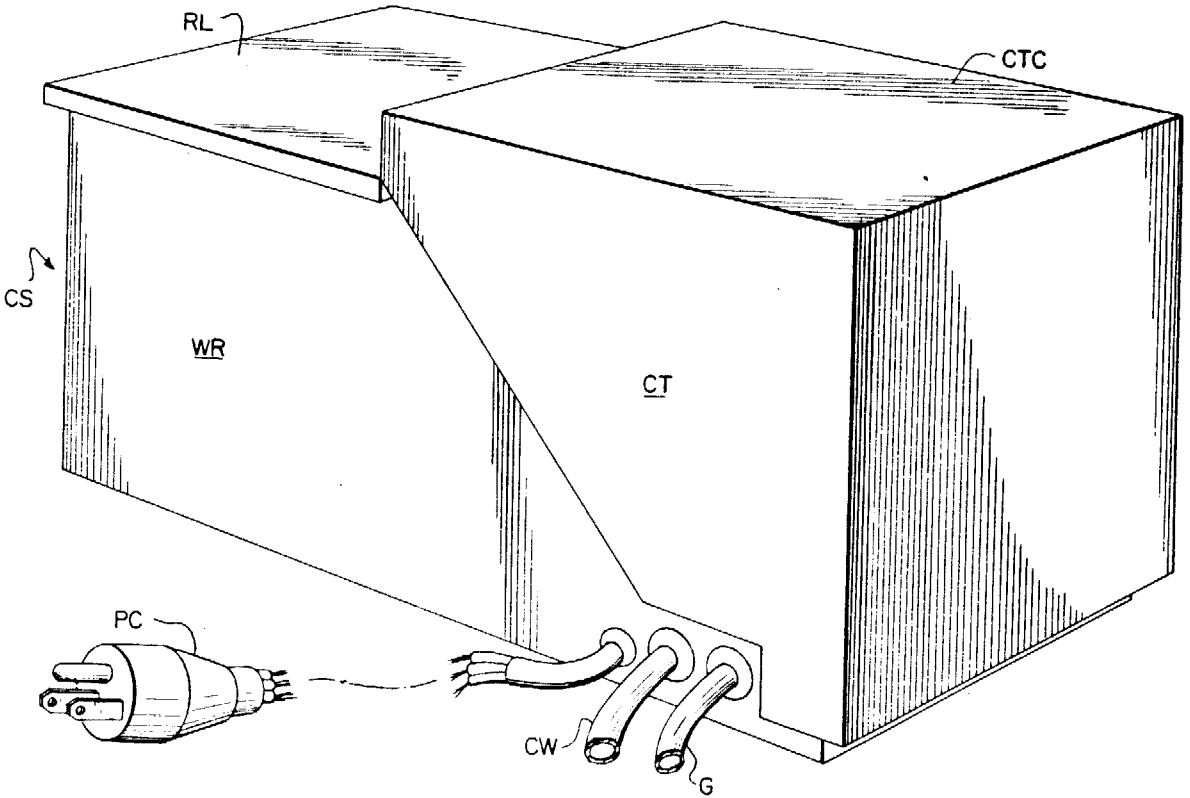
FIG. 8 is a perspective view of the exterior of the carbonator system of the present invention.
Figure 9:
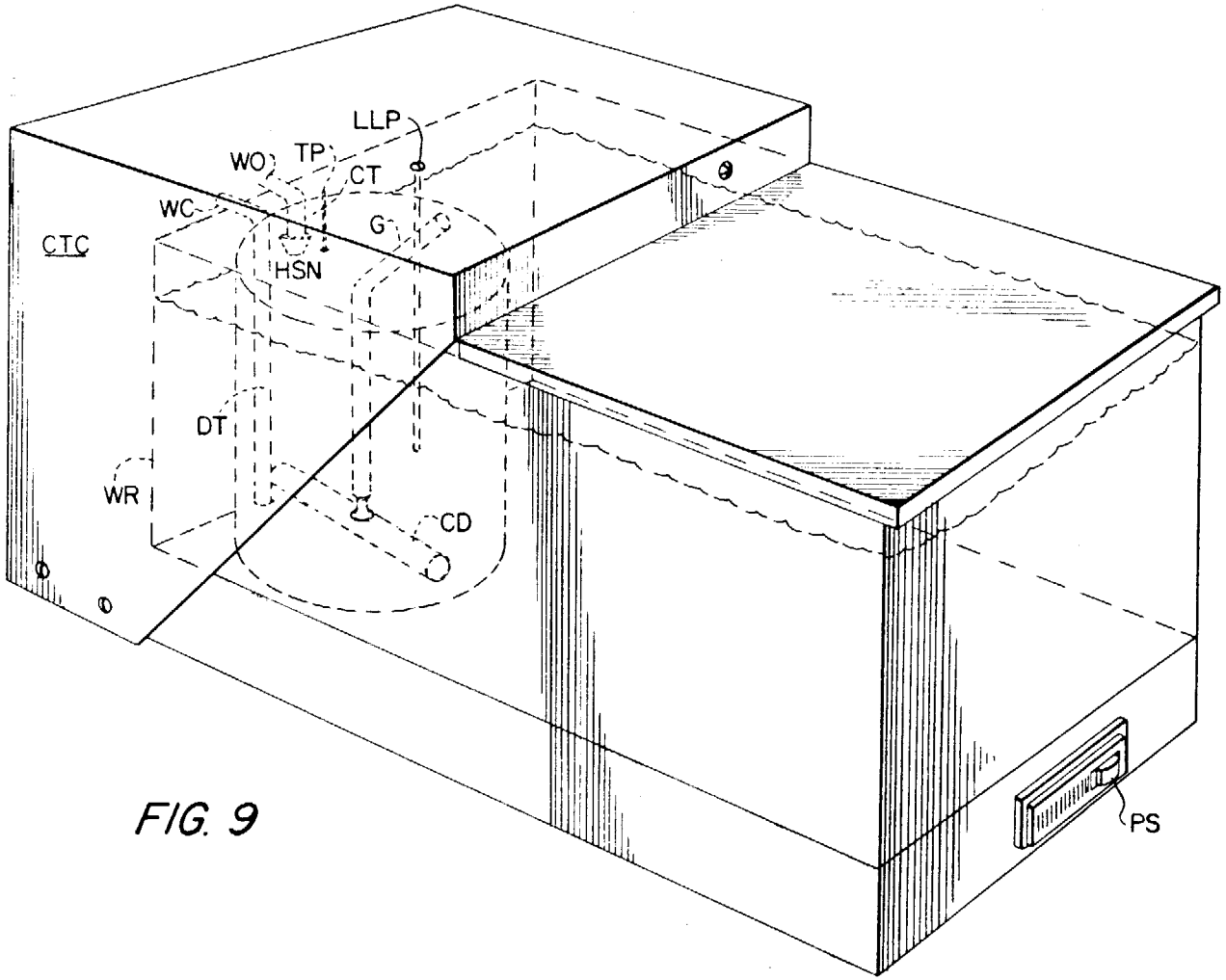
FIG. 9 is a diagrammatic view in perspective of the carbonator water supply and reservoir system of the present invention.
Figure 10:
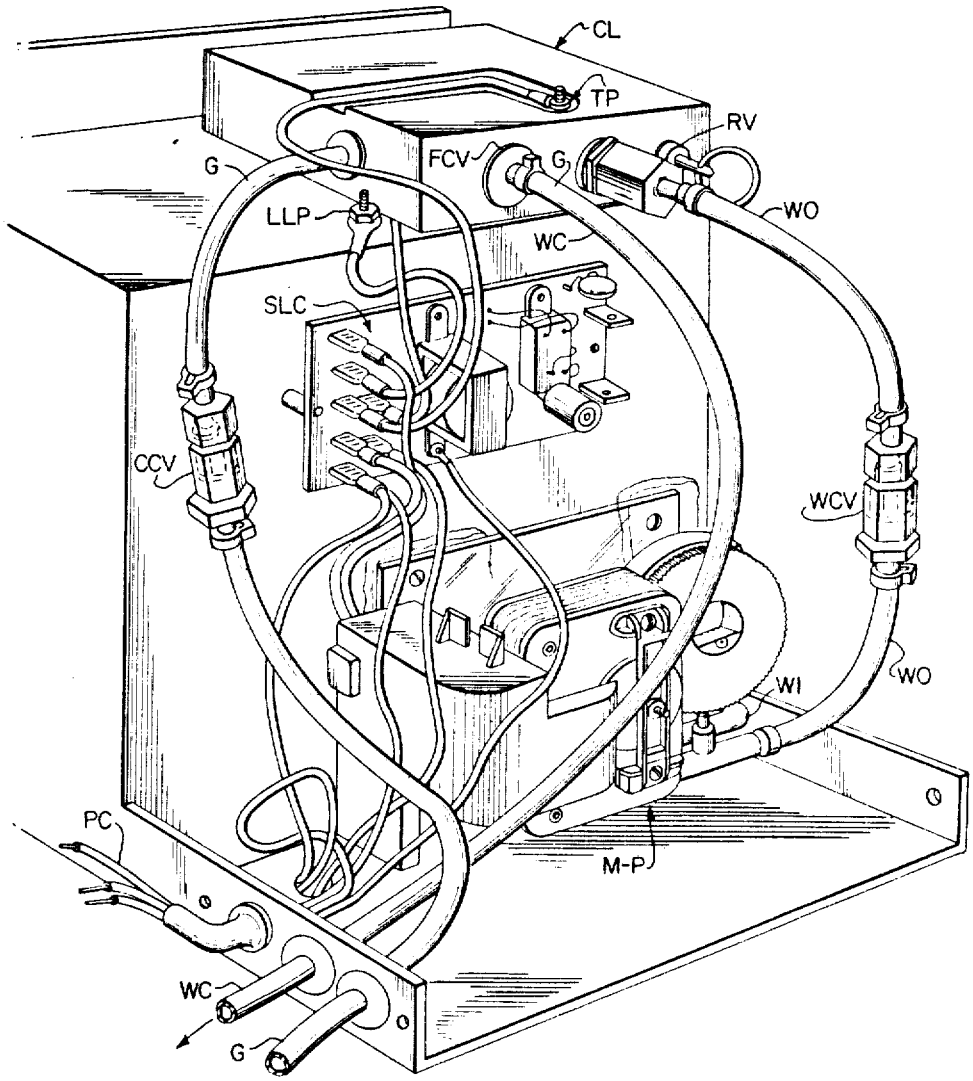
FIG. 10 is a perspective view of the carbonator pump and power station of the present invention.

The carbonator system for use in the post-mix dispenser of the present invention is illustrated in detail in FIGS. 8–10 and is illustrated as a component to the overall system in FIG. 14.

FIG. 8 is a perspective view of the exterior of the carbonator system housing and includes a water reservoir section WR and a carbonator tank section CT. The water reservoir section is provided with a removable water lid RL so that the water reservoir WR may be manually refilled, such as by a pitcher filled with tap water and so cubes or crushed ice may be placed therein. The carbonator tank section includes a removable cover CT which provides access to the carbonator tank CT and the carbonator power section of FIG. 10 to be described hereinafter. Electric power is supplied to the carbonator system through an electric power cord PC, this being the only connector with devices outside the refrigerator required by the system of the present invention. However, the power cord may be fed through a hole in the conventional refrigerator door gasket of the refrigerator making retro-fitting of the system very simple. Th tube CW and G passing through the bottom of the carbonator system housing illustrated in FIG. 8 are the carbonated water outlet and the $CO_2$ inlet of the system, respectively.

Referring in detail to FIG. 9 there is illustrated a diagrammatic view of how the water reservoir WR and the carbonator tank CT fit within the housing of the carbonator system of FIG. 8. As illustrated, the carbonator tank CT is immersed within the water of the water reservoir WR. This assists in cooling the carbonated water formed in carbonator tank CT since the water in reservoir WR is chilled by the refrigerator. In addition cubed or crushed ice may be placed in reservoir WR. Therefore, the carbonator system of the present invention provides for maximum chilling of the carbonated water delivered to the valving system VS in the door of the refrigerator. Many of the water lines and carbonated water tube connections are not illustrated in FIG. 9 for clarity of explanation. However, the low level water reservoir probe LLP in reservoir tank WR and the carbonator tank liquid level probe TP are illustrated. The details of operation of these probes LLP and TP will be described further hereinafter.

Briefly, as illustrated in FIG. 9, the bottom of probe LLP is positioned at a predetermined low water level above the bottom of water reservoir WR. Probe LLP comprises an electrically conductive member of electrode which completes an electrical circuit through the water in tank WR to ground through a connection grounding the walls of tank CT as long as water in tank WR is at least at the level of the bottom of probe LLP. When the water in tank WR falls below the level of the bottom end of probe LLP an electrical signal is generated which indicates that the water in the reservoir WR has fallen below a satisfactory level. An indicator light may be provided to advise one to refill the water reservoir when the water reaches this unsatisfactory level. When this occurs, power to the motor pump arrangement of FIG. 10 to be described hereinafter can not be supplied, thus shutting down the operation of the carbonator until the supply of water in reservoir WR is replenished. Probe TP in tank CT is also electrically conductive with its bottom end positioned at a predetermined level above the bottom of tank TP. Thus, as in the case of probe LLP, when the liquid level falls below the level of the bottom end of probe TP, an open circuit results between the probe and a grounded connection of tank CP turning on the pump to be described hereinafter. When water again reaches the bottom of probe TP a signal is generated which turns the pump off.

FIG. 9 also illustrates other elements to be described in connection with FIG. 10 including the provision of a power switch PS on the front end of the carbonator system housing so that the system can be manually shut on and off when desired.

Referring in detail to FIG. 10 there is illustrated an end view of the carbonator end of the housing of FIG. 8 with the carbonator tank cover CTC removed. As illustrated, the carbonator tank CT is provided with a manifold head or lid CL through which various connections to the $CO_2$ gas, carbonator water outlet and carbonator tank water supply are connected. See for example, the tubes WC, G and WO for transmission of carbonated water, $CO_2$ gas and water from reservoir WR, respectively. A duck-bill check valve CCV is provided in the tube G for regulating the flow of $CO_2$ gas to the carbonator tank CT. A flow control valve FCV is provided in the carbonated water outlet line WC at the fitting between line WC and the carbonator tank top CL. Valve FCV may comprise flow restricting buttons with bores of selected sizes for different flow rates. Another duck-bill check valve WCV is provided in water line WO between a motor and pumping system M-P to be described hereinafter. A relief valve RV is provided in the top of carbonator tank CL to limit the pressure in the carbonator tank to a predetermined maximum safe level. A low water level probe LLP is provided in water reservoir WR as described hereinbefore and a water level carbonator tank probe TP is provided in the carbonator tank CT. Both of these liquid level probes are electrically connected to a solid state level control module SLC by suitable wires. The motor and pumping system M-P has a water line WI in communication with water reservoir WR for pumping water out of tank WR in the carbonator tank CT on demand as determined by water level probes LLP and TP, respectively. Carbonator tank probes TP is of a similar nature to the water level LLP in reservoir WR. The bottom end of probe TP is positioned at a predetermined level above the bottom of a carbonator tank CT, (see FIG. 9) and when the water in tank CT falls below that level an electrical circuit through probe TP, the water, and a grounded wall of tank CT is open circuited. This open circuit is sensed by solid state level control module SLC. Module SLC then generates a signal to motor and pump M-P which causes the motor and pump to draw water out of reservoir WR through tubes WI, WO through check valve WCV and into carbonator tank CT via a hydraulic spray nozzle HSN. Thus, the water in carbonator tank CT is automatically replenished as its level falls below the bottom of probe TP. When water again reaches the bottom of probe TP a signal is generated through module SLC to turn pump M-P off.

Referring now in detail to FIGS. 8, 9 and 10 the operation of the carbonator system of the present invention will be briefly described. Water reservoir WR is initially filled by removing lid RL and a pitcher of water is poured into the reservoir. Power switch PS on the front wall of the carbonator system housing is then turned ON which enables all of the electrical water level control circuit of the carbonator. Once power is supplied and a proper water level is sensed by probe LLP in reservoir WR, motor and pump M-P is energized drawing water out of the reservoir WR, via tube WI, through pump M-P, tube WO, water check valve WCV, and hydraulic spray nozzle HSN to fill the carbonator tank. Simultaneously, $CO_2$ gas is being fed through the tube G into gas diffuser CD at the bottom of tank CT. When the valving system to be described hereinafter is actuated, indicating that the dispensing of carbonated water is desired, carbonated water flows up dip tube DT through carbonated water tube WC and out of the carbonated system to the valving system VS mounted on the door of the refrigerator.

Carbonated water sufficient for two six-ounce drinks is stored in the carbonator system in a preferred embodiment of the present invention ready for dispensing on demand. However, replacement of the carbonated water supply begins immediately by virtue of the water level controls heretofore described as a drink is drawn from the dispensing valve. Therefore, 18 ounces of product can be continuously drawn from a dispensing valve before the carbonator water supply is exhausted. A like quantity of carbonated water can be dispensed after waiting for one minute.

Power is supplied to the carbonator system of FIGS. 8 to 10 via a conventional three wire power cord PC intended to be plugged into the duplex power receptacle. The power cord PC can be provided with pressure sensitive adhesive on one of its flat surfaces so it can be attached or secured outside and inside of the refrigerator. The power cord PC is very thin and, therefore, entry into the refrigerator may be accomplished through the refrigerator door gasket making retro-fitting of the system of the present invention very simple.

$CO_2$ SYSTEM

Figure 11:
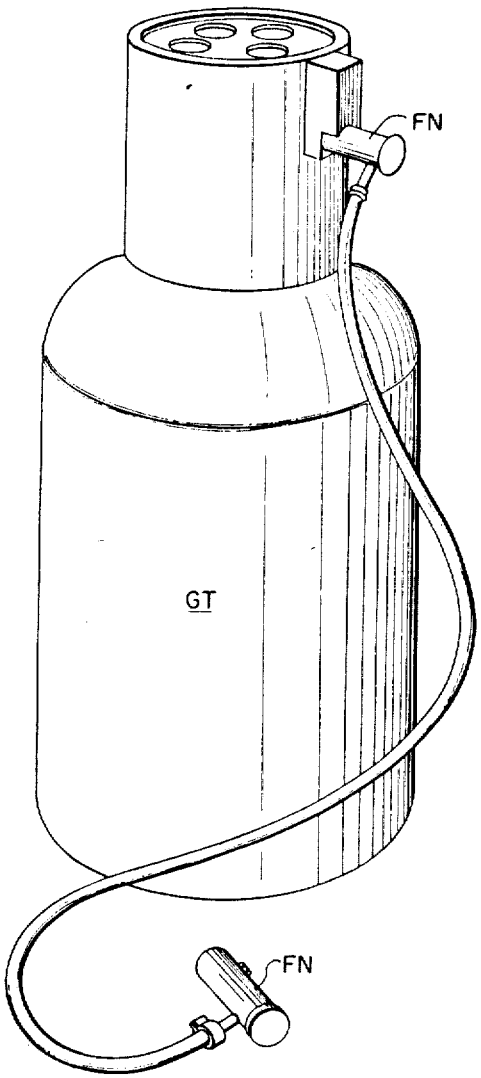
FIG. 11 is a perspective view of the $CO_2$ cylinder and regulator of the present invention used in conjunction with the carbonator system of FIGS. 8–10.

Referring to FIG. 11 the $CO_2$ system of the present invention in a preferred embodiment may be a two pound aluminum cylinder GT including a preset pressure regulator. Connection to the top of cylinder GT and to the gas tube connection G of the carbonator system may be by a pair of "football needle" valves FN to allow for quick connecting and disconnecting when desired. In a preferred embodiment the cylinder GT is mounted within the refrigerator, but if desired, the cylinder may be mounted outside the refrigerator and the gas tube passed through the refrigerator door gasket, as in the case of the electrical power cord. In a preferred embodiment the quantity of $CO_2$ contained within the cylinder GT is sufficient to carbonate 75 liters of product.

VALVING SYSTEM

Figure 13B:
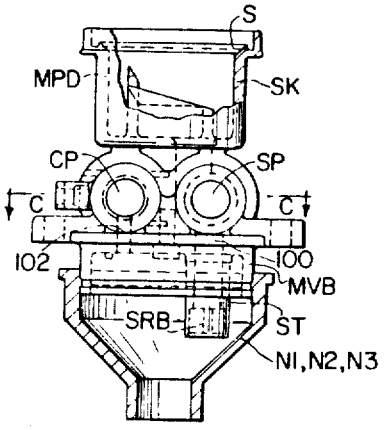
FIG. 13B is a front view of the valve unit of FIG. 12.
Figure 13C:
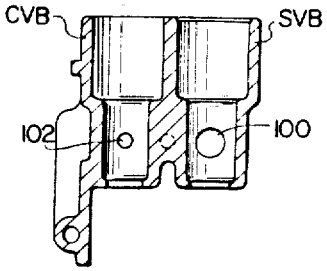
FIG. 13C is a sectional view taken along line C—C of FIG. 13B.
Figure 12:
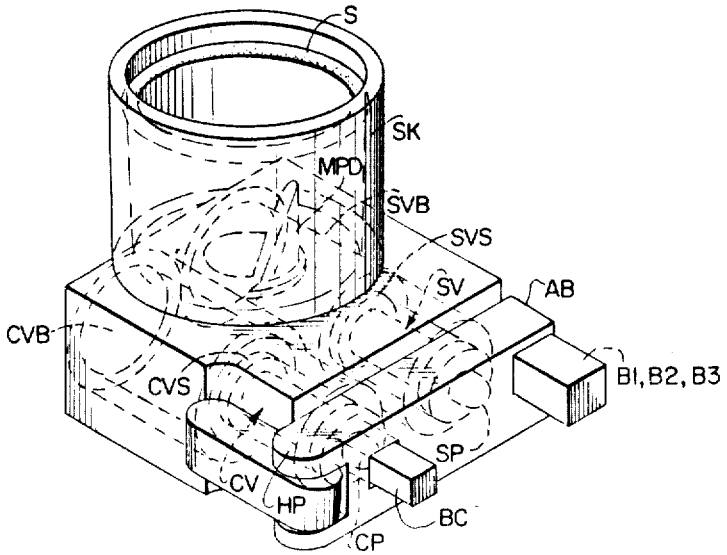
FIG. 12 is a perspective view of one unit of the valving system of the present invention.
Figure 13A:
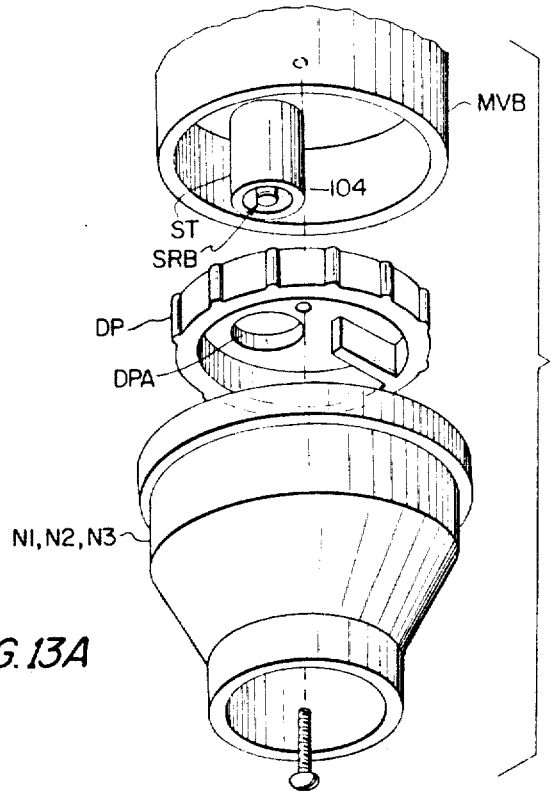
FIG. 13A is an exploded view of the dispensing valve mixing nozzle of the unit of FIG. 12.

Referring in detail to FIGS. 12 and 13 there is illustrated one of the three units of the valving system VS of the present invention previously described with respect to FIG. 14. The valving unit is provided with a cylindrical socket SK at the top thereof for receiving the neck portion 20 of the syrup package 10 described hereinbefore. A seal S is provided around the upper periphery of the socket SK to facilitate a tight connection with the neck 20 of the syrup package. A mechanical piercing device MPD is provided in the bottom of the socket, so that when a syrup package 20 is plugged into the socket SK piercing device MPD punctures membrane 20B thus opening the syrup package. The main body of the valve unit of FIG. 12 below the socket SK includes syrup valve SV and a carbonated water valve CV. Each of these valves includes an elastomeric or flexible valve member such as described in U.S. Pat. No. 3,417,962 having a centrally mounted plunger SP and CP, respectively. One end of the elastometric members is normally seated against valve seat SVS and CVS, respectively, precluding the flow of either syrup or carbonated water through the respective valves. Each of these valves has a main valve body SVB for the syrup and CVB for the carbonated water, which communicate through bores 100 and 102, respectively, with a dispensing and mixing nozzle to be described hereinafter with respect to FIGS. 13A to 13C. The mixing nozzles N1, N2, N3 are mounted on the bottom of the valve unit illustrated in FIG. 12 in fluid communication with the valve bodies SPB and CVB via the bores 100, 102 as best illustrated in FIGS. 13B, 13C.

An actuation means for either both the syrup valve SV and carbonated water valve CV, or the carbonated water valve alone is provided. The actuation means includes an actuation bar AB hinged on a pin HP at one end. At the opposite end of actuation bar AB there is provided a push button such as one of push buttons $B_1$, $B_2$, $B_3$ described hereinbefore with respect to FIG. 14. If it is desired to dispense a carbonated beverage, one must merely press one of the buttons $B_1$, $B_2$, $B_3$ which will cause the actuation bar AB to pivot about hinge pin HP and press against valve plungers SP and CP, simultaneously. This will cause the elastomeric members to unseat from valve seats SVS and CVS, respectively, permitting the simultaneous flow of carbonated water and syrup into the mixing nozzle through bores 100, 102 to be described hereinafter. A carbonated water button BC is provided and passes through an aperture in actuation bar AB into engagement with the carbonated water valve plunger CP. Thus, if one wishes to dispense only carbonated water, button BC can be individually pressed causing carbonated water alone to flow out of the mixing nozzle of FIGS. 13A, 13B.

Figure 15:
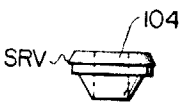

Referring to FIGS. 13A to 13C, there is illustrated the mixing nozzle of the present invention which includes a main valve body portion MVB mounted on the underside of the valve unit of FIG. 12 in communication with the syrup valve SV and carbonation water valve CV. A syrup tube ST is provided in main valve body MVB and communicates with the syrup valve SV via bore 100. Within syrup tube ST there is provided a replaceable syrup restriction button SRV with a bore 104 of a selected size. The size of bore 104 is chosen for the different Brix values of syrup to be dispensed by the particular dispensing unit buttons SRV illustrated in FIG. 15 are press fit into the end of tube ST. The bores 104 of replaceable syrup buttons SRB in conjunction with the flow control tube 18 and syrup packages 10 provide for an even controllable flow rate of syrup out of the dispenser nozzle. A diffuser plate is provided below the main valve body in nozzle N1, N2, N3 and is generally indicated DP. The diffuser plate is utilized in a well known fashion to diffuse the carbonated water passing through the nozzle. An aperture in plate DP is indicated at DPA through which a syrup tube ST passes so that the syrup does not pass through the diffuser plate. Below the diffuser plate is dispenser nozzle N1, N2, N3 wherein the syrup and carbonated water are mixed in desired proportions for dispensing the same into a cup or container held below the nozzle.

The system having been thus described it should be understood that many modifications can be made without departing from the spirit and scope of the present invention.

It is claimed:

1. A carbonator *system* comprising:

a refillable water reservoir tank with a removable lid to permit manual refilling thereof;

a carbonator tank disposed within said reservoir tank;

means for pumping water from said reservoir into said carbonator tank;

means for introducing carbon dioxide gas into said carbonator tank;

first liquid level detector means disposed in said reservoir tank for sensing when the water level is therein falls below a predetermined minimum level;

second liquid level detector means disposed in said carbonator tank for sensing when said water level therein falls below a predetermined minimum level; *and* control means responsive to both said first and second liquid level detector means for enabling said means for pumping when said water level in said carbonator tank falls below said predetermined level and disabling said means for pumping when said water level in said reservoir tank falls below said predetermmined level[;].

[third liquid level detector means disposed in said reservoir tank for sensing when the water level therein falls below a predetermined minimum level; and control means responsive to said third liquid level detector means for disabling said pump means when water falls below said minimum level.]

*2. A carbonator system comprising:*

*a refillable water reservoir tank with a removable lid to permit manual refilling thereof;*

*a carbonator tank operatively connected to said reservoir tank;*

*means for pumping water from said reservoir tank into said carbonator tank;*

*first liquid level detector means disposed in said reservoir tank for sensing when the water level therein falls below a predetermined minimum level;*

*second liquid level detector means disposed in said carbonator tank for sensing when said water level therein falls below a predetermined minimum level; and*

*control means responsive to both said first and second liquid level detector means for enabling said means for pumping when said water level in said carbonator tank falls below said predetermined level and disabling said means for pumping when said water level in said reservoir tank falls below said predetermined level.*

* * * * *